(12) United States Patent
Eilos et al.

(10) Patent No.: US 9,096,802 B2
(45) Date of Patent: Aug. 4, 2015

(54) METHOD OF PRODUCING A HYDROCARBON COMPOSITION

(75) Inventors: Isto Eilos, Porvoo (FI); Ilkka Hiltunen, VTT (FI); Sebastian Johansson, Kyrkslätt (FI); Esa Kurkela, VTT (FI); Pekka Simell, VTT (FI); Sami Toppinen, Helsinki (FI)

(73) Assignee: NESTE OIL OYJ, Porvoo (FI)

( * ) Notice: Subject to any disclaimer, the term of this patent is extended or adjusted under 35 U.S.C. 154(b) by 413 days.

(21) Appl. No.: 13/483,955

(22) Filed: May 30, 2012

(65) Prior Publication Data

US 2012/0309856 A1 Dec. 6, 2012

Related U.S. Application Data

(60) Provisional application No. 61/491,244, filed on May 30, 2011.

(30) Foreign Application Priority Data

May 30, 2011 (EP) .................................... 11168096

(51) Int. Cl.
| | |
|---|---|
| *C07C 27/00* | (2006.01) |
| *C10G 2/00* | (2006.01) |
| *C01B 3/48* | (2006.01) |
| *C01B 3/52* | (2006.01) |
| *C10K 3/00* | (2006.01) |
| *C10K 1/00* | (2006.01) |
| *C10K 1/02* | (2006.01) |
| *C10K 1/08* | (2006.01) |
| *C10K 1/10* | (2006.01) |
| *C10K 1/32* | (2006.01) |
| *C10K 3/04* | (2006.01) |

(52) U.S. Cl.
CPC ... *C10G 2/30* (2013.01); *C01B 3/48* (2013.01); *C01B 3/52* (2013.01); *C10K 1/004* (2013.01); *C10K 1/005* (2013.01); *C10K 1/024* (2013.01); *C10K 1/08* (2013.01); *C10K 1/10* (2013.01); *C10K 1/101* (2013.01); *C10K 1/32* (2013.01); *C10K 3/003* (2013.01); *C10K 3/006* (2013.01); *C10K 3/04* (2013.01); *C01B 2203/0205* (2013.01); *C01B 2203/0283* (2013.01); *C01B 2203/04* (2013.01); *C01B 2203/048* (2013.01); *C01B 2203/0415* (2013.01); *C01B 2203/0465* (2013.01); *C01B 2203/0475* (2013.01); *C01B 2203/0485* (2013.01); *C01B 2203/062* (2013.01); *C01B 2203/1241* (2013.01); *C01B 2203/1252* (2013.01); *C01B 2203/142* (2013.01); *C10G 2300/1011* (2013.01); *C10G 2300/1022* (2013.01); *C10G 2300/207* (2013.01); *C10J 2300/0916* (2013.01); *C10J 2300/1659* (2013.01); *C10J 2300/1846* (2013.01); *Y02E 50/32* (2013.01)

(58) Field of Classification Search
CPC ............. C10G 2/30; C10G 2300/1011; C10G 2300/1022; C10K 1/005; C10K 1/08; C10K 1/32; C10B 2203/0205; C10B 2303/04; C10B 2203/062; C10B 2203/1241; C10J 2300/1659
USPC .................................. 518/700, 702; 48/197 R
See application file for complete search history.

(56) References Cited

U.S. PATENT DOCUMENTS

| | | | |
|---|---|---|---|
| 5,604,047 | A | 2/1997 | Bellows et al. |
| 6,306,917 | B1 | 10/2001 | Bohn et al. |
| 2007/0100003 | A1 | 5/2007 | Holley et al. |
| 2010/0186291 | A1 | 7/2010 | Yie et al. |
| 2010/0298449 | A1 | 11/2010 | Rojey |
| 2010/0305220 | A1 | 12/2010 | Kukkonen et al. |
| 2010/0317749 | A1 | 12/2010 | Kukkonen et al. |
| 2010/0317905 | A1 | 12/2010 | Kukkonen et al. |
| 2011/0009501 | A1 | 1/2011 | Ernst |
| 2011/0118366 | A1 | 5/2011 | Menzel |

FOREIGN PATENT DOCUMENTS

| | | |
|---|---|---|
| CN | 101307248 A | 11/2008 |
| CN | 101845319 A | 9/2010 |
| CN | 101979468 A | 2/2011 |
| CN | 102066526 A | 5/2011 |
| WO | 2006/134471 A2 | 12/2006 |
| WO | WO 2009/013233 A2 | 1/2009 |
| WO | WO 2009/059819 A1 | 5/2009 |
| WO | WO 2009/113006 A2 | 9/2009 |
| WO | 2011/107661 A1 | 9/2011 |

OTHER PUBLICATIONS

European Search Report (EPO Form 1507N) dated Oct. 7, 2011.
(Continued)

*Primary Examiner* — Jafar Parsa
(74) *Attorney, Agent, or Firm* — Buchanan Ingersoll & Rooney PC

(57) ABSTRACT

Method of producing a hydrocarbon composition in which a biomass raw-material is gasified to produce a raw syngas containing carbon monoxide, carbon dioxide and hydrogen, the hydrogen-to-carbon monoxide ratio being about 0.5 to 1.7. A part of the impurities is removed to produce a clean syngas which is fed into a Fischer-Tropsch reactor where a significant part of the carbon monoxide and hydrogen is converted to a hydrocarbon composition containing $C_4$-$C_{90}$ hydrocarbons. A hydrocarbon composition is recovered which mainly contains hydrocarbons which are solid or semi-solid at ambient temperature and pressure and an off-gas of the Fischer-Tropsch reactor, including hydrocarbons which are gaseous at ambient temperature and pressure, is used for producing hydrogen gas. By introducing hydrogen into the clean syngas, the hydrogen to carbon monoxide ratio can be increased and by using off-gas-produced hydrogen, the capacity of the process is significantly improved.

24 Claims, 2 Drawing Sheets

(56) References Cited

OTHER PUBLICATIONS

International Search Report (Form PCT/ISA/210) and the Written Opinion of the International Searching Authority (Form PCT/ISA/237) dated May 30, 2012, issued in corresponding International Application No. PCT/FI2012/050525. (12 pages).

Chinese Office Action issued in co-pending Chinese Application No. 201280026345.3 dated Sep. 3, 2014, and English translation thereof.

Office Action (Second Office Action) issued on Mar. 10, 2015 by the Chinese Patent Office in corresponding Chinese Patent Application No. 201280026345.3, and an English Translation of the Office Action. (19 pages).

METHOD OF PRODUCING A HYDROCARBON COMPOSITION

RELATED APPLICATIONS

This application claims priority under 35 U.S.C. §119 to European Patent Application No. 11168096.3 filed in Europe on May 30, 2011, the entire content of which is hereby incorporated by reference in its entirety. This application also claims priority under 35 U.S.C. §119 of U.S. Provisional Application No. 61/491,244 filed on May 30, 2011, the entire content of which is hereby incorporated by reference in its entirety.

FIELD

Disclosed are hydrocarbon compositions. Disclosed is a method of producing hydrocarbon compositions, for example, hydrocarbon compositions of the kind which can be used in the production of fuel for combustion engines.

BACKGROUND INFORMATION

In a Fischer-Tropsch reactor (in the following also abbreviated FT reactor), hydrogen and carbon monoxide are reacted in the presence of a transition metal catalyst, such as cobalt or iron, to form a composition containing a broad range of hydrocarbons.

Typically, the effluent of a Fischer-Tropsch reactor will comprise hydrocarbons which are liquid or solid or semi-solid at ambient temperature and pressure (the latter also called "waxes"). Such hydrocarbons can be processed to fuel class, for example diesel oil, hydrocarbon compositions, or alternatively the hydrocarbons can be converted to intermediate compositions from which fuel class hydrocarbons can be produced. In addition the reactor effluent will comprise hydrocarbons which are gaseous at ambient temperature and pressure. The latter kind of hydrocarbons is represented by methane and hydrocarbons of typically 2 to 4 carbon atoms.

A number of carbonaceous sources have been used as raw-materials for producing hydrogen and carbon monoxide containing synthesis gas (hereinafter referred as to syngas) which can be fed into the FT process. Originally, coal was used as the primary raw-material, but lately also natural gas has been taken into use in commercial processes. Even more recently various processes have been developed in which biological materials, such as plant oils, plant waxes and other plant products and plant parts or even oils and waxes of animal origin, are gasified and processed to produce a suitable feed. In a further alternative approach, viz. in the BTL process (biomass to liquid process), a biomass comprising whole plants is used as a raw-material. The BTL process allows for the utilization of forestry residues.

A BTL process can include the steps of biomass feed pre-treatment, biomass gasification, raw syngas cooling and filtering, raw gas purification, shift reaction for balancing $H_2/CO$ ratio, FT-process and FT product refining. For gasification of the biomass oxygen steam can be used (e.g. by blowing it into the gasification zone) for minimizing inerts in syngas.

In gasification, can be preferred to use steam or oxygen or combinations thereof blown into the gasification zone for fuel production by the FT process. A typical temperature range is about 700 to 950° C. At these conditions, biomass, such as lignocellulosic materials, will produce a gas containing carbon monoxide, carbon dioxide, hydrogen and water gas. It further contains some hydrocarbons and impurities, such as sulphur and trace metals.

Whereas a gasifier operated at the above conditions can produce a gas having a molar ratio of hydrogen to carbon monoxide of about 0.5 to 1.4 depending on feedstock, the Fischer-Tropsch reactor can require a higher molar ratio of about 2:1. Therefore, it can be desirable to increase said ratio in the gas produced in such a gasifier.

For this purpose, it is possible to carry out gasification at a higher temperature of, for example, 950° C. or more. Higher gasification temperatures decreases crease tarry side-products in raw syngas but may cause sintering problems for gasifier.

Another option to reduce tarry side products in raw syngas is to feed the gas into a catalytic reformer (see patent application FI20105201) wherein the gas is subjected to further thermal reactions which give a product mix containing an increased portion of carbon monoxide. The gaseous effluent of the reformer has to be freed from carbon dioxide, water and catalyst poisons before it can be used as a syngas for a FT reaction. Furthermore, the hydrogen-to-carbon monoxide ratio may need to be even further increased.

It is possible to achieve the latter goal by subjecting the gas to a water gas shift (WGS) reaction. In the shift reaction hydrogen is produced by reacting carbon monoxide with water to produce carbon dioxide and hydrogen.

The art is impaired by considerable problems. Thus, catalysts used in shift reactions are notoriously sensitive to impurities of the kind produced by gasification of biomass. Examples of such impurities include hydrosulphide ($H_2S$), ammonia ($NH_3$), hydrochloride (HCl), hydrogen cyanide (HCN) and particles which act as catalyst poisons and/or inhibitors for reactions. Small solid coke- and crystallized phosphor-containing particles are typically also present in the raw syngas.

Generally, impurities and particles will accumulate in any shift and hydrolysis catalyst bed reactors and cause problems in terms of corrosion and plugging and deactivation of the catalysts. The concentration of particles and impurities and other catalyst poisons in the inlet to the shift reactor therefore have to be strongly reduced, normally by extensive purification. The shift reaction will also have to be carried out at rather high temperature to limit catalyst poisoning.

As shift reactor catalyst there exists two different types of catalyst in the market, one for very low sulphur level gas shift, typically for less than one ppm hydrogen sulphide level for feed gas and an other for high sulphur level feeds, typically for 200 ppm hydrogen sulphide level in feed. Many biobased feedstock as wood residuals have sulphur level that yields to 50-200 ppm hydrogen sulphide level in syngas after gasification and reforming steps. These sulphur level syngas can be either purified to meet low sulphur level shift catalyst requirements or extra hydrogen sulphide can be added to shift gas feed to meet high sulphur level shift catalyst requirements.

For the above reasons, it is difficult economically to carry out an efficient shift reaction using raw syngas on an industrial scale.

SUMMARY

According to an exemplary aspect, a method of producing a hydrocarbon composition is provided, the method comprising: providing a biomass raw-material; gasifying the raw-material by oxygen-blown gasification to produce a raw syngas containing carbon monoxide, carbon dioxide, hydrogen, hydrocarbons and gaseous and particulate impurities, said raw syngas having a hydrogen-to-carbon monoxide ratio of about 0.5 to 1.7; removing at least a part of the impurities to produce a clean syngas; feeding the clean syngas to a Fischer-Tropsch reactor; converting in the Fischer-Tropsch reactor at least a part of the carbon monoxide and hydrogen contained in the syngas into a hydrocarbon composition containing $C_4$-$C_{90}$ hydrocarbons; recovering from the Fischer-Tropsch reactor a hydrocarbon composition which mainly contains hydrocarbons which are solid or semisolid at ambient temperature and pressure; wherein the hydrogen-to-carbon monoxide ratio of the syngas is raised to 1.6 to 2.1 at the latest when the syngas is fed into the Fischer-Tropsch reactor, wherein the method further comprises: separately recovering from the Fischer-Tropsch reactor an off-gas comprising hydrocarbons which are gaseous at ambient temperature and pressure; separately producing hydrogen from the gaseous hydrocarbons of said off-gas; and feeding at least a part of the hydrogen gas produced from the gaseous hydrocarbons of said off-gas, into the clean syngas in order to increase the hydrogen-to-carbon monoxide ratio of said clean syngas.

DETAILED DESCRIPTION

Figure 1:
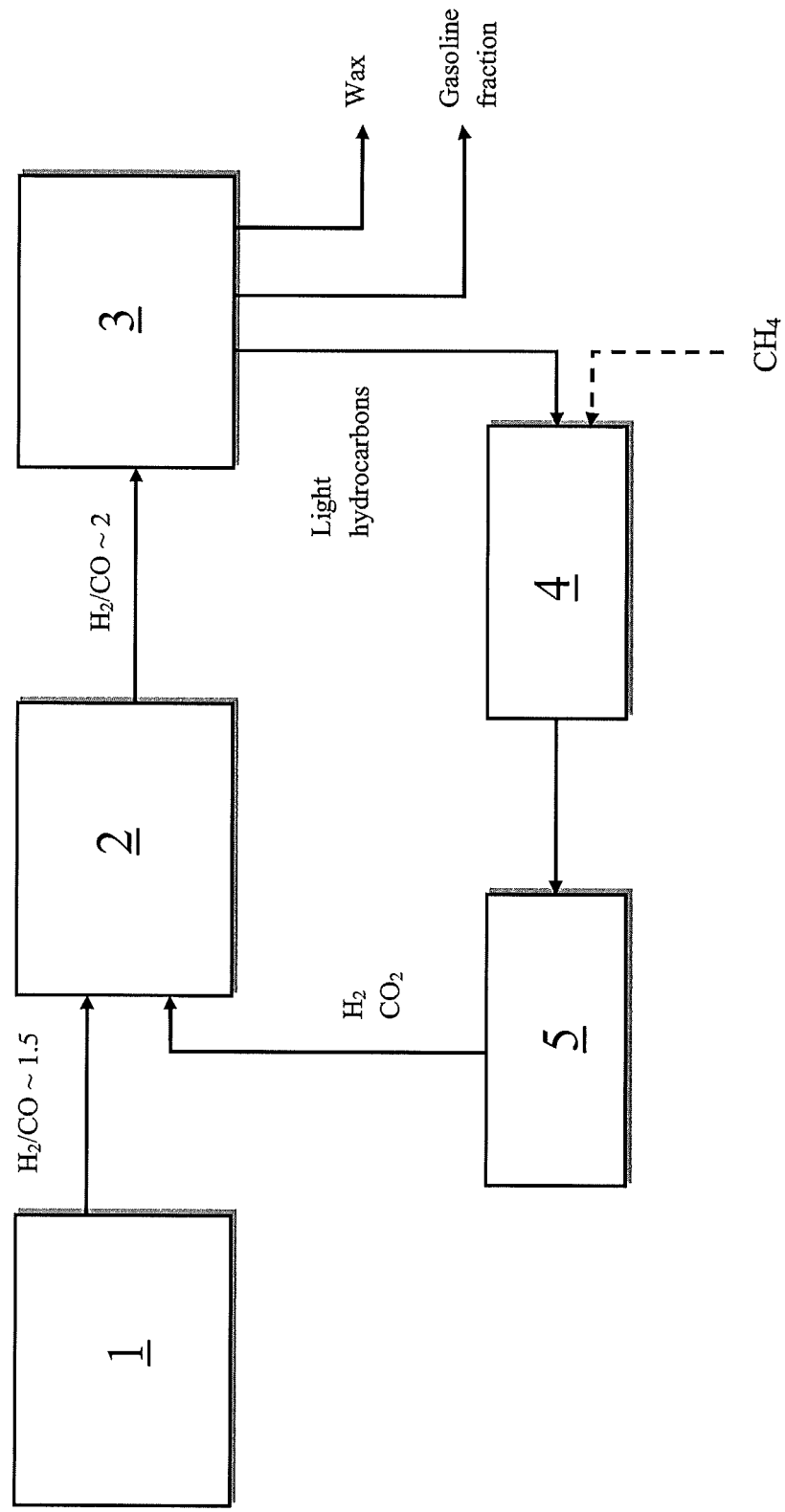
FIG. 1 shows the process scheme of a first exemplary embodiment.

In accordance with an exemplary aspect, it is possible to eliminate at least a part of the problems related to the art and to provide a novel method of producing hydrocarbon compositions by gasification of biomass and Fischer-Tropsch processing of hydrogen and carbon monoxide.

An exemplary aspect is based on the concept of using gaseous hydrocarbons of the Fischer-Tropsch reactor for producing additional hydrogen. It is known in the art to recycle off-gases of Fischer-Tropsch reactors (WO 2009/013233 and WO 2009/113006).

These gases, also known as off-gases of the Fischer-Tropsch reaction, are—for all practical purposes—totally free from impurities. This has two important implications: First, the gases can be used for hydrogen production without prior purification. In practice the gases can be fed as such into, for example, reforming and shift reactions for producing hydrogen. Second, after hydrogen conversion, the recycled off-gases can be combined with a clean syngas after hydrogen sulphide removal step, for example, a syngas that is freed from catalyst poisons.

The hydrogen conversion can be carried out externally, for example, in reaction units placed in the circulation line of the recycled off-gases, before the hydrogen thus produced is fed into the syngas flow of the FT process.

Considerable advantages can be obtained by means of exemplary aspects. External hydrogen production from the recycled light hydrocarbons can be effected using technology such as reforming and shift reaction. Standard catalysts and processes can be used in said reactions, because the gas contains no reaction inhibiting impurities. The hydrogen production can be carried out at lower temperatures than for raw syngas. By introducing hydrogen into the syngas, hydrogen to carbon monoxide ratio will be increased and by using off-gas-produced hydrogen, the capacity of the process can be improved.

An exemplary aspect allows for improved, more exact control of the hydrogen-to-carbon monoxide ratio. Compared to a comparative process, wherein there is no recycle of off-gas from the FT reaction zone to the syngas, an exemplary aspect can be more advantageous as far as energy economy is concerned (in terms of energy consumption for the production of one unit of hydrocarbons).

The hydrogen produced can be fed into the syngas produced by gasification of biomass at a predetermined point of the process, for example, after normal purification of the syngas aiming at removing impurities stemming from the gasification and before the gas is fed into the Fischer-Tropsch reactor. Carbon dioxide contained in the hydrogen stream can be eliminated by processes using, for example, amine or methanol washing.

In an exemplary embodiment, the purified gas obtained from the FT is recycled to the main syngas stream to a point downstream of the removal of impurities such as hydrogen sulphide, hydrogen chloride, ammonia, hydrogen cyanide and carbonyl sulphide and mixtures thereof from said syngas. For this reason the total purification efficiency of the process is improved, when evaluated based on the volume of the syngas, and this means that the dimensions of the purification units can be reduced as can the capacity of the pressurizing compressor of the main syngas stream.

Throughout the specification, the term "reforming" is used to denote a processes, such as steam reforming or autothermal reforming, whereby hydrogen is produced from hydrocarbons. Non-limiting examples of some reactions taking place during reforming are given below in reaction schemes I and II.

As discussed above, an exemplary aspect concerns a method of producing hydrocarbon compositions by a Fischer-Tropsch (FT) reaction from a synthesis gas obtained by gasification of biomass.

The FT product can be a gas or liquid or solid or semisolid (wax). The FT reaction can produce a broad range of hydrocarbons, some of which (light hydrocarbons having 1 to 4 carbon atoms) are gaseous at ambient temperature and pressure. The balance of the hydrocarbons is liquid or, for example, solid or semisolid. This part of the hydrocarbon composition of the FT reaction can be formed by linear hydrocarbons having 4 to 90 carbon atoms, for example, about 5 to 60 carbon atoms. There can be some branched hydrocarbons in the product. Primarily the hydrocarbons are saturated (alkanes) although unsaturated compounds can be included in minor amount of less than 10 mol-%, for example, less than about 5 mol-%. Depending on the catalyst used, some oxygenated hydrocarbons can be formed as impurities.

In the present context, an exemplary embodiment comprises liquid compositions having a carbon number of more than 5. For example, the composition has a distillation cut point in the range of about 150 to 300° C., for example, 180 to 240° C.

Another exemplary embodiment comprises waxes and similar hydrocarbons which are solid or semisolid at ambient conditions (temperature and pressure). The solid or semisolid hydrocarbons can be suitable for the production of fuels for combustion engines.

The hydrocarbons can be further processed as will be explained below.

Producing hydrocarbons of the above kind suitable for biofuel applications (after potential further processing) from wood residuals and from pulp/paper industry's waste streams or peat and similar biomass feedstocks can require several subprocesses;

drying of raw material;
oxygen production;
gasification of biomaterial to raw syngas;
syngas cooling and filtering;
tar reforming/cracking;
production of additional hydrogen for achieving desired hydrogen/carbon monoxide ratio (shift reaction);
purification of syngas for Fischer-Tropsch process requirements;
carrying out the Fischer-Tropsch process;
handling and recycling of the Fischer-Tropsch off-gas;
stabilization of the Fischer-Tropsch product stabilization and fractioning; and
further processing of the Fischer-Tropsch wax to biofuel.

In the first step of the process, an organic raw-material is gasified in the presence of oxygen to produce a gas containing carbon monoxide, carbon dioxide, hydrogen and hydrocarbons possibly together with inert components. The organic raw-material or feedstock of the process can be a material composed of biological matter, for example, of a matter of vegetable or animal origin. In the present context, the term "biomass" will be used for designating any such raw-material.

An exemplary feature of the feedstock materials of the present process is that they contain carbon, for example, in excess of about 20%, for example, in excess of about 30%, for example, in excess of about 40% by dry matter. The biomass feedstock can be selected from annual or perennial plants and parts and residues thereof, such as wood, wood chips and particles (saw dust etc), forestry residues and thinnings; agricultural residues, such as straw, olive thinnings; energy crops, such as willow, energy hay, *Miscanthous*; and peat. It is also possible to use various waste materials, such as refuse derived fuel (RDF); wastes from sawmills, plywood, furniture and other mechanical forestry wastes; and waste slurries (including industrial and municipal wastes). In addition to such materials of vegetable origin, various animal products such as fats and waxes can also be used.

The biomass can be gasified in a fluidized bed reactor or a circulating fluidized bed reactor (CFB) gasifier in the presence of oxygen at a temperature in the range of about 750 to 950° C. The circulating bed is formed by a granular or particulate bed material, such as aluminosilicate (e.g. sand) or a similar inorganic material. The biomass can be milled or grinded to an average particle or granule size of less than about 5 cm, for example, less than about 2 cm, before gasification. It is typically fed into the reactor with a moisture content of less than 25% by weight, for example, to 15% by weight or less. Gasification can be promoted by feeding steam, air or oxygen into the reactor, exemplary advantageous results being obtained with oxygen and oxygen in combination with steam.

Depending on the biomass and the temperature and on the concentration of oxygen, the "carbon conversion", i.e., conversion of elemental carbon contained in the raw-material into light compounds, hydrocarbons and tar, is higher than 70%, for example, higher than 75%, for example, in excess of 80% by weight of the carbon in the raw-material.

By gasification, a gas containing carbon monoxide, hydrogen and carbon dioxide as main components along with some methane and other light hydrocarbons and water or steam is produced. The gas is recovered. It can be used in the Fischer-Tropsch process for producing hydrocarbons by reacting carbon monoxide with hydrogen in the presence of a catalyst for converting at least a significant part of the carbon monoxide and hydrogen contained in the gas into a hydrocarbon composition containing $C_4$-$C_{90}$ hydrocarbons. The hydrocarbon composition thus obtained is recovered and subjected to further processing.

In an exemplary embodiment, a method includes a combination of low- to moderate-temperature gasification followed by catalytic reforming.

In an exemplary embodiment, gasification is carried out at a first temperature and reforming at a second temperature, which is higher than the first temperature. For example, the reforming can be carried out in catalyst bed reformer at a temperature in excess of 850° C., for example, about 900-1200° C. Gasification can be carried out at 750 to 950° C.

An exemplary embodiment comprises high-temperature gasification. For example such an embodiment may comprise the steps of
gasification of the raw-material in the presence of oxygen at a temperature in excess of 1000° C. to produce a gas containing carbon monoxide, carbon dioxide, hydrogen and hydrocarbons possibly together with inert components; and
further increasing the hydrogen-to-carbon monoxide ratio of the gas effluent to a value of about 2.

The gasified and reformed synthesis gas emanating from the gasification and reforming (in the following also "raw syngas") contains various catalyst poisons and small solid coke- and crystallized phosphorous particles. The "raw syngas" also contains sulphur and nitrogen compounds as hydrosulphide ($H_2S$), ammonia ($NH_3$), hydrogen cyanide (HCN) and hydrochloride (HCl) along with the particles and traces for other impurities. These impurities can accumulate in any shift and hydrolysis catalyst bed reactors and may cause problems in terms of corrosion and plugging, deactivation or inhibitors of the catalysts. Therefore, the raw syngas has to be subjected to purification comprising removing at least a part, for example, an essential part, of the impurities to produce a purified syngas, in the following "clean syngas".

According to an exemplary embodiment, the gaseous effluent withdrawn from the reformer ("raw syngas") is subjected to purification in a water scrubber. The purification can comprise the steps of:
cooling the gaseous effluent to a temperature below 500° C.; and
washing the gaseous effluent in a water scrubber at a pressure of 80 kPa to 4000 kPa using water of a temperature in the range of about 30 to 80° C., for example, 40 to 60° C. to remove ammonia ($NH_3$) and hydrochloride (HCl), and particles.

The scrubber can be operated as a counter-current washer by introducing the gas from the reformer into the bottom part of the scrubber and by feeding water from the top of the scrubber.

As a result, clean syngas is obtained. This syngas can be further purified to remove other components, such as hydrogen sulphide and carbon dioxide, before feeding into a FT reactor. The hydrogen to carbon monoxide ration can be adjusted to the level desired for the FT synthesis. In an exemplary gasification reactor, a product gas exhibiting a molar ratio of hydrogen to carbon monoxide of 0.5 to 1.7 is produced. For example, gasification of a wood, annual plant or peat raw-material will upon gasification in the presence of oxygen gas yield a product gas in which the molar ratio of hydrogen to carbon monoxide is about 0.8 to 1.4. For example, the molar ratio of hydrogen-to-carbon monoxide is raised to 1.6 to 2.1, depending on the actual catalyst used. The hydrogen-to-carbon monoxide ratio can be raised to about 2 before the Fischer-Tropsch reaction. The expression "about 2" can cover the field of 1.6 to 2.1.

For this reason, there can be a need for a separate step in which the ratio is increased, said step being carried out at the latest immediately before or even simultaneously with the Fischer-Tropsch reaction.

In an exemplary embodiment, hydrogen gas is added to the hydrogen sulphide free syngas. To that aim, from the Fischer-Tropsch reactor, off-gas comprising hydrocarbons which are gaseous at ambient temperature and pressure (in the following also "light hydrocarbons") are withdrawn and separately recovered and used for the production of hydrogen. At least a part, for example, all of the hydrogen gas thus obtained is then fed into the clean syngas whereby the hydrogen-to-carbon monoxide ratio of the clean syngas is increased.

The hydrocarbons of the off-gas of the Fischer-Tropsch reactor can comprise saturated or unsaturated, linear or branched $C_1$ to $C_4$ hydrocarbons, for example, saturated $C_1$ to $C_4$ hydrocarbons, such as methane.

According to an exemplary embodiment, hydrogen gas is produced from the gaseous hydrocarbons of said off-gas by subjecting them to at least one reforming reaction, or to at least one shift reaction, or for example, to a combination of both. "Shift" reaction is an abbreviation for the "water gas shift" reaction (cf. below). The reaction units mentioned herein can be located outside the path of the main syngas stream (the one-pass flow thorough the process).

For example, hydrogen gas is produced by subjecting the hydrocarbons of the off-gas to at least one reforming reaction and to at least one shift reaction, said reactions being carried out in the indicated order in a cascade.

At least one of the reforming and shift reaction units is placed in the circulation line of the off-gas, for example, the unit(s) is (are) external to the syngas flow from gasification to FT reaction of the main process.

In the reformer, reaction I takes place, and in the shift reactor, reaction II takes place:

$$CH_4 + H_2O \leftrightarrow CO + 3H_2 \quad (I)$$

$$CO + H_2O \leftrightarrow CO_2 + H_2 \quad (II)$$

By the reforming and/or shift reactions, methane and other light hydrocarbons are therefore first converted to hydrogen and carbon monoxide by reaction of methane with steam (reaction I), and then more hydrogen is produced from the carbon monoxide by reacting it with steam to yield carbon dioxide and hydrogen (reaction II). Reforming can also be carried out in the presence of oxygen.

As will be evident, by merely subjecting the source of methane and other light hydrocarbons to reforming, a product mixture is obtained having a hydrogen-to-carbon monoxide molar ratio of 3:1. This may be sufficient for raising the hydrogen-to-carbon monoxide ratio flow of the syngas produced by biomass gasification to a value in the range of 2. The product mixture of hydrogen and carbon monoxide is interesting also because the carbon monoxide is one of the components of the FT feed.

By subjecting the reforming effluent to a shift reaction, more hydrogen is obtained along with carbon dioxide.

In reforming (I), methane is partially oxidized by an exothermic reaction. The temperature of the reaction is about 800 to 950° C. and the pressure about 5 to 100 bar (abs). A metal catalyst, such as a transition or nobel metal catalyst can be used.

The shift reaction (II) can be carried out at a temperature generally in the range of about 150 to 400° C. and at a pressure of about 1.5 to 10 bar (abs.). For example, the shift reaction can be carried out in two stages, comprising a first, high temperature shift reaction at about 350° C. and a second, low temperature shift reaction at a temperature of about 180 to 220° C. Suitable catalysts are various metal oxide catalysts, such as transition metal oxides and mixtures thereof on supports, including iron oxide, chromium oxide and zinc oxide.

According to an exemplary embodiment, at least a part, for example, a majority, based on the volume, of the gaseous (light) hydrocarbons withdrawn from the Fischer-Tropsch reactor is recycled from said reactor to the syngas via processing step(s) in which light hydrocarbons, primarily methane, are converted to hydrogen, and the hydrogen to carbon monoxide ratio is adjusted according to reaction (II) before recycling the stream into the syngas. In other words, the recycled off-gases are converted to hydrogen, and the hydrogen to carbon monoxide ratio can be adjusted in reactions carried out outside the main syngas stream.

The term "main syngas stream" is used for designating the gas stream which travels through the process from gasification to the outlet of the Fischer-Tropsch reactor, excluding the branching side streams which optionally are removed or recycled.

For example, using the off-gas of the FT, it is possible to complement the hydrogen content of the clean syngas so as to reach the desired $H_2/CO$ ratio of about 2. When desired it is, however, possible to complement the reforming and shift reactions with the feed of external light hydrocarbons, for example, $C_1$ to $O_4$ hydrocarbons. The term "external" hydrocarbons refer to hydrocarbons which are not generated in the Fischer-Tropsch reaction in issue (but which may stem from another FT process, or from any other source).

For practical reasons it can be advantageous to feed the external light hydrocarbons into the off-gas recycle before hydrogen production, for example, to incorporate the external HC's into the off-gas before it is introduced into the reformer. Accordingly, in an exemplary embodiment, methane for example in the form of or derived from natural gas, is fed into the methane-rich off-gas which is being recycled to the clean syngas before the hydrocarbons are subjected to reforming and shift.

The ratio of external methane to the methane present in the recycled gas can be, based on volume, for example 1:100 to 100:1, for example, 1:50 to 50:1, for example, about 1:20 to 20:1.

In the embodiments wherein the hydrogen gas is produced by a shift reaction, some carbon dioxide is generated. Thus, the hydrogen gas introduced into the clean gas increases the carbon dioxide content of the clean gas. Before the FT reactor, the concentration of carbon dioxide can be reduced to a level which is reasonably low, typically below 3 mole-%. Thus significantly all of the carbon dioxide contained in the gas is removed before it is fed into the Fischer-Tropsch reactor.

After the introduction of the hydrogen produced from the light hydrocarbons of the off-gas, optionally complemented with external methane etc. the modified clean syngas can be subjected to a gas treatment step in which carbon dioxide is removed from the syngas.

Carbon dioxide can be withdrawn from the gas at a point downstream any gas washing process arranged before the Fischer-Tropsch reactor. Exemplary gas washing processes include washing units, hydrolysation reactors, units for removing water and hydrogen sulphide and purging beds for other impurities, such as HCl and carbonylic compounds.

There are various means available for separating and washing away of carbon dioxide from gas streams containing carbon dioxide. Carbon dioxide can be separated from the gas for example by membrane, by pressure swing absorption (PSA) or by washing with a liquid, for example, methanol or amine, capable of absorbing carbon dioxide.

Methanol or amine washing units can be expensive and they can be replaced by membrane units or pressure swing absorption units for removing and recovering carbon dioxide.

There are various PSA masses which are selective for CO, hydrogen and water. Molecular sieves for absorption of CO comprises for example aluminosilicates and alkaline earth metals. For adsorbing water, various alumina compounds can be used (see, for example, U.S. Pat. No. 5,604,047). The feed gas of the PSA unit contains hydrogen, carbon dioxide and carbon monoxide. The temperature of the gas, about 40° C. and the pressure level are suitable for the PSA absorbers.

Another option is to separate carbon dioxide with a selective membrane from the gaseous effluent of the previous unit. Selective membranes of polymeric type based on polyamines and polyimide are commercially available for selective carbon dioxide separation from synthesis gas.

The recovered carbon dioxide can be used for forming carbon monoxide. According to one embodiment, at least a part of the carbon dioxide is used for forming carbon monoxide by a reversed water gas shift reaction by use of external hydrogen.

The reversed water gas shift reaction can be carried out at a temperature generally in the range of about 500 to 1000° C. For example, the reversed water gas shift reaction can be carried out at a temperature of about 700 to 900° C. Such conditions will favor the reaction of carbon dioxide and hydrogen to yield carbon monoxide and water. The reactions are endothermic which means that the temperature of an adiabatic reactor will drop with about 130° C. during operation. Suitable catalysts are at least iron and nickel metal catalysts.

Before the FT reactor there can be at least some guard beds for removing metals and hydrogen sulphide.

According to an exemplary embodiment, the pressure of the syngas is increased to the pressure of the Fischer-Tropsch reaction immediately before, during or after the gas treatment step.

The FT reaction will produce hydrocarbons on a large range from $C_1$ to $C_{99}$. The light hydrocarbons are withdrawn and used as explained above. The heavier hydrocarbons are converted to useful fuel components.

In case of waxes and similar hydrocarbons which are solid or semi-solid at ambient temperature and, generally, also in case of any high-molecular weight hydrocarbons, the Fischer-Tropsch hydrocarbon composition can be further processed by hydrogenation with hydrogen gas at an increased temperature in the presence of a catalyst in order to produce a hydrocarbon composition suitable as a diesel class hydrocarbon or as composition from which such a hydrocarbon can be produced. For example, hydrogenation with hydrogen gas is performed at a temperature of about 300° C. in a fixed bed reactor. The catalyst can be a supported or unsupported metal catalyst, e.g., nickel on carbon.

An exemplary method comprises the following:
gasifying the raw-material in the presence of oxygen to produce a gas containing carbon monoxide, carbon dioxide, hydrogen and hydrocarbons possibly together with inert components;
feeding the gas obtained by gasification of the raw-material into a reformer;
reforming the gas in the presence of oxygen at a temperature in excess of 850° C. in order to increase the ratio of hydrogen to carbon monoxide in a gaseous effluent of the reformer to a value in the range of 0.5 to 1.5;
withdrawing the gaseous effluent from an outlet of the reformer;
cooling the gaseous effluent to a temperature below 500° C.;
washing the gaseous effluent in a water scrubber at a pressure of 80 kPa to 4000 kPa using water of a temperature in the range of about 30 to 80° C., for example, 40 to 60° C. to remove ammonia ($NH_3$), hydrochloride (HCl), and particles;
optionally further removing hydrogen sulphide ($H_2S$) and carbon dioxide ($CO_2$) either in one step or two step process (see, for example, co-pending patent application no. EP 11153704.9, the content of which is herewith incorporated by reference);
further increasing the hydrogen-to-carbon monoxide ratio of the gaseous effluent to a value of about 2 by introducing hydrogen, produced as disclosed herein, into the gas stream.

Next, an exemplary aspect will be elucidated with the aid of the attached drawings.

FIG. 1 shows a basic process embodiment of an exemplary aspect.

Reference numeral 1 stands for a number of upstream processing steps including optional pretreatment of the raw-material, e.g., grinding and drying, gasification, raw syngas cooling and filtering, and raw gas purification, e.g., by reforming to remove tars. The hydrogen to carbon monoxide molar ratio of the syngas after these operations is about 1.5.

The gasifier can be of any suitable type, typically a circulating bed reactor wherein biomass is combusted at increased temperature in the presence of oxygen.

The reformer can be a catalytic reformer which can be operated at temperature up to about 1000° C. The reformer can be for example a catalytic reactor with solid catalyst beds and provided with feed for oxygen or other gases for enhancing the reforming reactions.

The task of the reformer is to free gas fed into the reformer from tarry compounds and to increase the hydrogen-to-carbon monoxide ratio. The effluent of unit 1 can contain hydrogen, carbon monoxide, carbon dioxide, water and methane (2 to 4% by volume).

Reference numeral 2 stands for a unit wherein the hydrogen to carbon monoxide ratio is increased from the post-reformer value of about 1.5 to 2. The ratio is increased by introducing hydrogen gas. However, in view of the hydrogen gas contained from the reforming and shift reactions (reference numerals 4 and 5) of the off-gas of the FT reactor 3, the concentration of carbon dioxide increases somewhat. The syngas is subjected to elimination of carbon dioxide at the same time.

The syngas thus obtained as an effluent of unit 2 contains hydrogen, carbon monoxide, and some methane. The syngas is fed into a Fischer-Tropsch reactor 3, wherein hydrocarbons are produced by reaction III:

$$(2n+1)H_2 + nCO \rightarrow C_nH_{(2n+2)} + nH_2O \qquad (III)$$
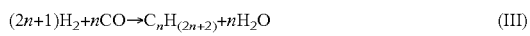

wherein n stands for an integer of 1 to 99.

In the FT reactor a series of chemical reactions take place. Exemplary useful reactions give rise to alkanes. The FT reactor 3 can be operated at a temperature of about 150 to 300° C.

The effluent is divided in at least three stream, for example, a semisolid/solid fraction containing hydrocarbon wax, a liquid stream containing hydrocarbons of the gasoline fractions and a light fraction containing $CH_4$ (methane) along with other $C_2$ to $C_4$ hydrocarbons.

Whereas the solid/semisolid and liquid fractions are taken to further processing for producing fuels, the light fraction is recycled to the FT process. FIG. 1 gives reference numerals 4 and 5 for the external reforming 4 and shift 5 reaction units employed for producing hydrogen. The term "external" refers to units which are placed outside the flow from gasification to the FT unit, for example, according to the present technology, the external units are placed in the circulation of the recycled hydrocarbon streams obtained from the FT unit. As suggested by the hashed line, additional methane can be fed into reforming 4.

There are a number of exemplary benefits related to the use of cycle gas reformers and shifts reaction units. The catalyst is and stays more active than in a reformer in view of the high purity of the gas. As a result, a smaller catalyst volume and lower temperatures can be needed. The energy desired for reforming can be supplied by indirect heating, for example by heating waste gas or natural gas rather than synthesis gas. The carbon dioxide produced by combustion will be removed with the flue gases and it does not end up among the synthesis gas. Further, the gas flow volumes in the upstream part of the process and in the washing section are reduced.

In units 4 and 5, a gas flow containing hydrogen and carbon dioxide is produced. The gas flow is conducted into unit 2, as explained above.

Figure 2:
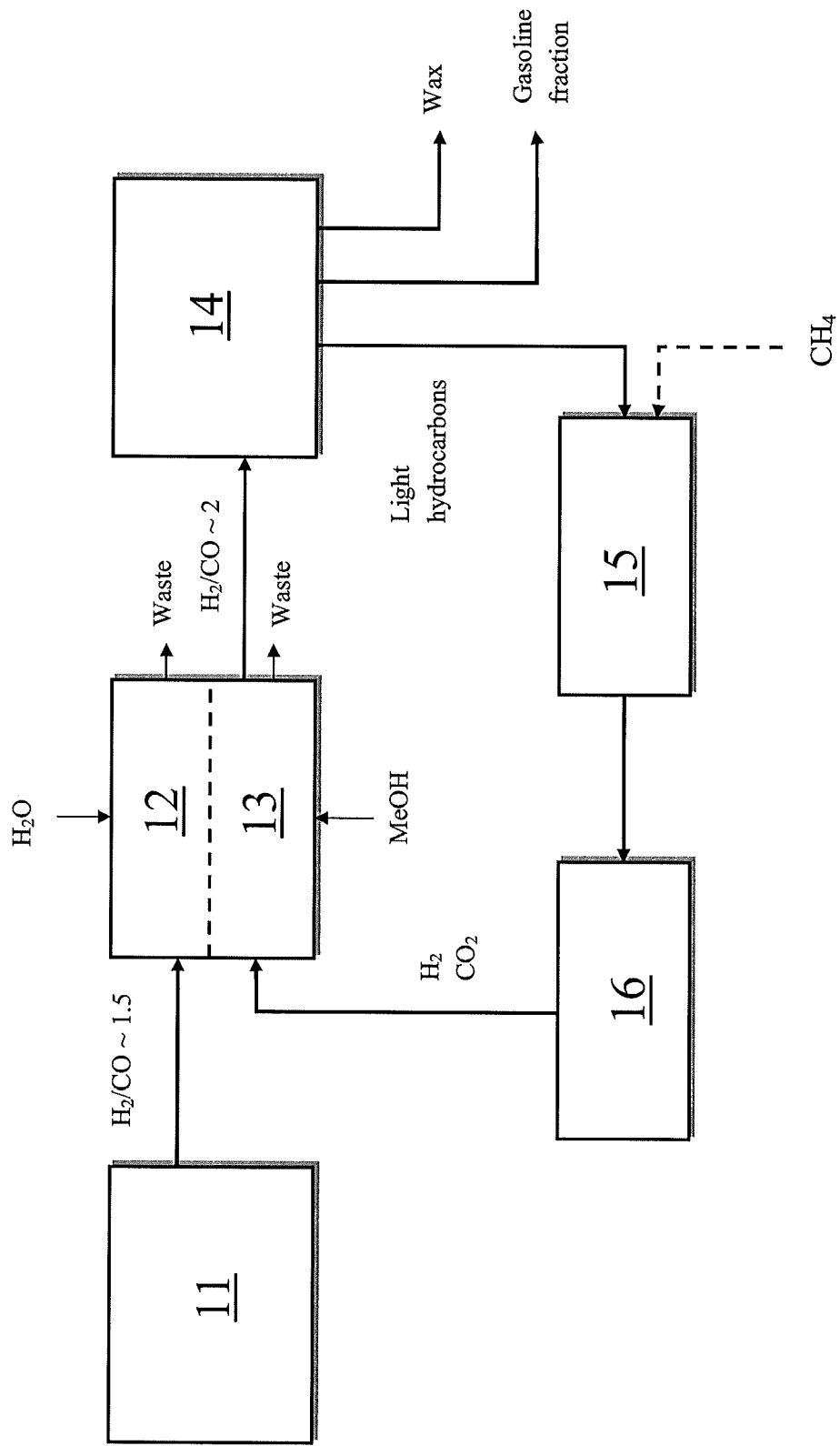
FIG. 2 shows the process scheme of a second exemplary embodiment.

FIG. 2 shows a modified process embodiment according to an exemplary aspect.

As in the case of the process according to FIG. 1, the first reference numeral (in this case no. 11) stands for a number of upstream processing steps including optional pretreatment of the raw-material, e.g., grinding and drying, gasification, raw syngas cooling and filtering, and raw gas purification. e.g., by reforming to remove tars. The hydrogen to carbon monoxide molar ratio of the syngas after these operations is about 1.5.

The gasified and reformed synthesis gas emanating from gasifier/reformer unit 11 contains also hydrosulphide ($H_2S$), ammonia ($NH_3$), hydrochloride (HCl), hydrogen cyanide (HCN) and particles. These impurities and particles can accumulate in any shift and hydrolysis catalyst bed reactors and may cause problems in terms of corrosion and plugging and deactivation of the catalysts.

The syngas from the gasfier/reformer 11 can be subjected to an improved purification step 12 according to an exemplary embodiment. According to an exemplary embodiment, the syngas emanating from unit 11 is cooled to a temperature below 300° C. in scrubber 12 and washed in a water scrubber at temperatures in the range of about 30 to 80° C., for example, 40 to 60° C., and at a pressure of 80 kPa to 4000 kPa. The actual conditions will be selected depending on the operating conditions, for example, on the pressure, of the gasifier and reformer 11. In an exemplary embodiment, the syngas is subjected to counter-current washing. Thus, the gas can be fed from the bottom part of the scrubber and water is fed from the top of the scrubber, using normal gas scrubbing practice.

With the aid of a gas washing operation of the above kind, small particles can be practically entirely removed and other catalyst poisons, such as ammonia and hydrochloride, without removing the desired main gas components, CO and $H_2$.

An exemplary advantage of this embodiment is that the scrubber also provides optimal feed for a possible compressor to be needed in case of low gasifier and reformer operation pressures.

Reference numeral 13 refers to a unit for washing away carbon dioxide from the gas stream.

Otherwise, the embodiment of FIG. 2 corresponds to that of FIG. 1. The following numbers are used: FT reactor 14, external methane reformer reactor unit 15, and shift reactor unit 16 for the effluent of reformer 15.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of producing a hydrocarbon composition, the method comprising:
   providing a biomass raw-material;
   gasifying the raw-material by oxygen-blown gasification to produce a raw syngas containing carbon monoxide, carbon dioxide, hydrogen, hydrocarbons and gaseous and particulate impurities, said raw syngas having a hydrogen-to-carbon monoxide ratio of about 0.5 to 1.7;
   removing at least a part of the impurities to produce a clean syngas;
   feeding the clean syngas to a Fischer-Tropsch reactor;
   converting in the Fischer-Tropsch reactor at least a part of the carbon monoxide and hydrogen contained in the syngas into a hydrocarbon composition containing C4-C90 hydrocarbons;
   recovering from the Fischer-Tropsch reactor a hydrocarbon composition which mainly contains hydrocarbons which are solid or semisolid at ambient temperature and pressure;
   wherein the hydrogen-to-carbon monoxide ratio of the syngas is raised when the syngas is fed into the Fischer-Tropsch reactor,
   wherein the method further comprises:
   separately recovering from the Fischer-Tropsch reactor an off-gas comprising hydrocarbons which are gaseous at ambient temperature and pressure;
   separately producing hydrogen from the gaseous hydrocarbons of said off-gas; and
   feeding at least a part of the hydrogen gas produced from the gaseous hydrocarbons of said off-gas, into the clean syngas in order to increase the hydrogen-to-carbon monoxide ratio of said clean syngas,
   wherein carbon dioxide removal occurs only in a single carbon dioxide removal unit,
   wherein the hydrogen gas produced from the gaseous hydrocarbons of said off-gas is introduced upstream from the carbon dioxide removal unit or into the carbon dioxide removal unit.

2. The method according to claim 1, comprising:
   producing hydrogen gas from the gaseous hydrocarbons of said off-gas by subjecting them to at least one reforming reaction and to at least one shift reaction outside the main syngas stream.

3. The method according to claim 2, wherein the at least one reforming reaction and the at least one shift reaction are carried out in series, wherein the at least one reforming reaction is carried out prior to the at least one shift reaction.

4. The method according to claim 1, wherein the hydrogen gas produced from said hydrocarbons is introduced into the syngas before a gas treatment step in which carbon dioxide is removed from the syngas.

5. The method according to claim 4, wherein carbon dioxide is separated from the syngas by membrane filtration, by pressure swing absorption or by washing with a liquid capable of absorbing carbon dioxide.

6. The method according to claim 4, wherein substantially all of the carbon dioxide contained in the gas is removed before it is fed into the Fischer-Tropsch reactor.

7. The method according to claim 4, wherein the pressure of the syngas is increased to the pressure of the Fischer-Tropsch reaction immediately before, during or after the gas treatment step.

8. The method according to claim 1, wherein said hydrocarbons of the off-gas of the Fischer-Tropsch reactor comprise saturated or unsaturated, linear or branched $C_1$ to $C_4$ hydrocarbons.

9. The method according to claim 1, wherein at least a part, based on the volume, of the recovered gaseous hydrocarbons is recycled from the Fischer-Tropsch reactor to the syngas via at least one step in which light hydrocarbons are converted to hydrogen.

10. The method according to claim 9, wherein external light hydrocarbons are fed into the recovered gaseous hydrocarbons which are being recycled to the syngas before the hydrocarbons are subjected to a step for converting light hydrocarbons into hydrogen.

11. The method according to claim 10, wherein a ratio of methane present in the external light hydrocarbons to a methane present in the recycled gas is, based on volume, 1:100 to 100:1.

12. The method according to claim 1, comprising:
gasifying the raw-material in the presence of oxygen to produce a gas containing carbon monoxide, carbon dioxide, hydrogen and hydrocarbons, optionally with inert components;
feeding the gas obtained by gasification of the raw-material into a reformer;
reforming the gas in the presence of oxygen at a temperature in excess of 850° C. in order to increase the ratio of hydrogen to carbon monoxide in a gaseous effluent of the reformer to a value in the range of 0.5 to 1.7;
withdrawing the gaseous effluent from an outlet of the reformer;
cooling the gaseous effluent to a temperature below 500° C.;
washing the gaseous effluent in a water scrubber at a pressure of 80 kPa to 4000 kPa using water of a temperature in the range of about 30 to 80° C. to remove ammonia ($NH_3$), hydrochloride (HCl) and particles;
removing hydrogen sulphide ($H_2S$) and carbon dioxide ($CO_2$) in a one step or two step process; and
increasing the hydrogen-to-carbon monoxide ratio of the gaseous effluent to a value of about 2 by introducing hydrogen therein.

13. The method according to claim 5, wherein carbon dioxide is separated from the syngas by washing with methanol.

14. The method according to claim 1, wherein said hydrocarbons of the off-gas of the Fischer-Tropsch reactor comprise saturated, linear or branched $C_1$ to $C_4$ hydrocarbons.

15. The method according to claim 1, wherein said hydrocarbons of the off-gas of the Fischer-Tropsch reactor comprise methane.

16. The method according to claim 1, wherein a majority, based on the volume, of the recovered gaseous hydrocarbons is recycled from the Fischer-Tropsch reactor to the syngas via at least one step in which light hydrocarbons comprising methane are converted to hydrogen.

17. The method according to claim 10, wherein the external light hydrocarbons comprise $C_1$ to $C_4$ hydrocarbons.

18. The method according to claim 10, wherein the external light hydrocarbons comprise methane.

19. The method according to claim 10, wherein a ratio of methane present in the external light hydrocarbons to a methane present in the recycled gas is, based on volume, 1:50 to 50:1.

20. The method according to claim 10, wherein a ratio of methane present in the external light hydrocarbons to a methane present in the recycled gas is, based on volume, about 1:20 to 20:1.

21. The method according to claim 12, wherein the gaseous effluent is washed in a water scrubber using water of a temperature in the range of 40 to 60° C.

22. The method according to claim 1, wherein the hydrogen-to-carbon monoxide ratio of the syngas is raised to 1.6 to 2.1 when the syngas is fed into the Fischer-Tropsch reactor.

23. The method according to claim 1, wherein all of the hydrogen gas produced from the gaseous hydrocarbons of said off-gas, is fed into the clean syngas in order to increase the hydrogen-to-carbon monoxide ratio of said clean syngas.

24. The method according to claim 1, wherein the hydrogen gas produced from the gaseous hydrocarbons of said off-gas is introduced into the carbon dioxide removal unit.

* * * * *